(12) United States Patent
Vanesko (10) Patent No.: US 7,342,922 B1
(45) Date of Patent: Mar. 11, 2008

(54) MULTI-STAGE SWITCHING FOR NETWORKS

(75) Inventor: Douglas J. Vanesko, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 10/086,517

(22) Filed: Feb. 28, 2002

Related U.S. Application Data (60) Provisional application No. 60/299,714, filed on Jun. 18, 2001.

(51) Int. Cl.
*H04Q 11/00* (2006.01)

(52) U.S. Cl. .................. 370/380; 370/360; 370/386

(58) Field of Classification Search ........... 370/360, 370/386, 387, 388, 390, 392, 400, 404, 405
See application file for complete search history.

(56) References Cited

U.S. PATENT DOCUMENTS

| | | | |
|---|---|---|---|
| 5,032,837 A * | 7/1991 | Yoshifuji ............... 340/2.22 |
| 5,276,425 A * | 1/1994 | Swanson et al. ........... 340/2.22 |
| 5,451,936 A | 9/1995 | Yang et al. ................ 340/826 |
| 5,703,879 A * | 12/1997 | Proctor et al. ............. 370/398 |
| 5,787,085 A * | 7/1998 | Fox ............................ 370/392 |
| 5,801,641 A | 9/1998 | Yang et al. ................ 340/826 |
| 6,418,142 B1 * | 7/2002 | Wolf .......................... 370/390 |
| 6,970,458 B1 * | 11/2005 | Lim ........................... 370/387 |
| 2002/0093952 A1 * | 7/2002 | Gonda ........................ 370/369 |
| 2002/0146003 A1 * | 10/2002 | Kam et al. .................. 370/388 |

* cited by examiner

*Primary Examiner*—Wing Chan
*Assistant Examiner*—Saba Tsegaye
(74) *Attorney, Agent, or Firm*—Cindy Kaplan (57) ABSTRACT

Techniques for multi-stage switching in network elements are provided. The switching fabric can include three stages and as connections are being made through the stages, the connections are selected to minimize the difference in the number of signals between different stages. Additionally, the switching fabric can include six identical chips where pairs of chips are utilized for each of the three stages.

16 Claims, 11 Drawing Sheets

| | Uni-link usage, difference | Multi-link usage, difference |
|---|---|---|
| Signal 2 on top Center Node (FIG. 6B) | 2,0,0,1 diff = 2 | 2,1,1,1 diff = 1 |
| Signal 2 on bottom Center Node (FIG. 6C) | 1,1,0,1 diff = 1 | 1,1,2,1 diff = 1 |

|  | Uni-link usage, difference | Multi-link usage, difference |
|---|---|---|
| Signal 2 on top Center Node (FIG. 6B) | 2,0,0,1  diff = 2 | 2,1,1,1  diff = 1 |
| Signal 2 on bottom Center Node (FIG. 6C) | 1,1,0,1  diff = 1 | 1,1,2,1  diff = 1 |

MULTI-STAGE SWITCHING FOR NETWORKS

This application claims priority to provisional Application No. 60/299,714, filed Jun. 18, 2001, which is hereby incorporated by reference.

BACKGROUND OF THE INVENTION

The present invention relates to multi-stage switching. More specifically, the invention relates to multi-stage grooming switches for use in networks.

"Switching" refers to the process of transmitting data from a set of input ports to a set of output ports. With multi-stage switching, the switching fabric includes multiple stages or nodes between the input ports and the output ports. Each node can be implemented in a variety of ways including a full $N^2$ cross-connect or a 2N Clos network.

A Clos network or matrix is a multi-stage interconnect where each switch in each stage is connected to each switch in the successive stage by exactly one link. For example, an asymmetric 2N Clos network has N inputs and outputs and 2N center states. In general, "blocking" occurs when a connection requirement is not fulfilled. With Clos networks, there are two types of blocking: rearrangable non-blocking and non-rearrangeable non-blocking. Rearrangable non-blocking refers to blocking where the existing connections can be moved to different center stages such that a center stage switch becomes available to make the desired connection. Non-rearrangable blocking refers to blocking where a connection that is blocked cannot be created with the current set of existing connections. A 2N Clos network has been proven to be rearrangably non-blocking for bi-cast (i.e., meaning that a signal can be output on two different links or outputs). When a signal is tri-cast, there is a possibility that the Clos network will be non-rearrangably blocked. The probability of this happening can be called the non-rearrangable blocking probability.

As communication networks continue to grow, there is an increasing need to design multi-stage switches that can handle significant increases in bandwidth and efficient to manufacture and operate. Additionally, it would be beneficial to provide a method of making connections through the switching fabric and reduces or eliminates the probability of blocking.

SUMMARY OF THE INVENTION

The present invention provides innovative techniques for multi-stage switching in networks. In general, a multi-stage network element switch can include input nodes, center nodes and output nodes. Each node has inputs and outputs, with the signals passing from the input nodes to the center nodes to the output nodes and out. By adjusting the switching capabilities of each node, the network element switch is able to be configured as desired. Some specific embodiments of the invention are described below.

In one embodiment, the invention provides a network element switch. The network element switch includes a pair of input nodes, with each input node having 2n inputs and 2n outputs (n is $\geq 1$). Additionally, the network element switch includes a pair of center nodes, with each center node receiving n inputs from each of the input nodes and having 2n outputs. The network element switch includes a pair of output nodes, with each output nodes receiving n inputs from each of the center nodes and having 2n outputs. Lastly, an any-to-any mapping is not guaranteed from the pair of input nodes to the pair of output nodes. In one embodiment, each node is a 2N Clos matrix.

In another embodiment, the invention provides a network element switch. The network element switch includes a pair of input nodes, with each input node having 2n inputs and 2n outputs (n is $\geq 1$). Additionally, the network element switch includes a pair of center nodes, with each center node receiving n inputs from each of the input nodes and having 2n outputs. The network element switch includes a pair of output nodes, with each output nodes receiving n inputs from each of the center nodes and having 2n outputs. Lastly, mapping links for signals between nodes is selected to minimize the differences between the number links between the nodes.

In another embodiment, the invention provides a method of mapping signals across a network element switch having input nodes, center nodes and output nodes. For each possible mapping of a specific signal across the network element switch, the number of signals between each of the input nodes and center nodes is calculated. Additionally, for each possible mapping of the specific signal across the network element switch, the number of signals between each of the center nodes and output nodes is calculated. The mapping of the specific signal across the network element switch is selected where the difference in the number of signals between each of the input nodes and center nodes is minimized and the difference in the number of signals between each of the center nodes and output nodes is minimized.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments that perform switching in network elements. However, embodiments of the invention are not limited to any particular environment, application or implementation. For example, six chip multi-stage embodiments will be described, but the invention may be advantageously applied to other configurations, including those that use fewer or more chips and/or stages. Therefore, the description of the embodiments that follows is for purposes of illustration and not limitation.

Figure 1:
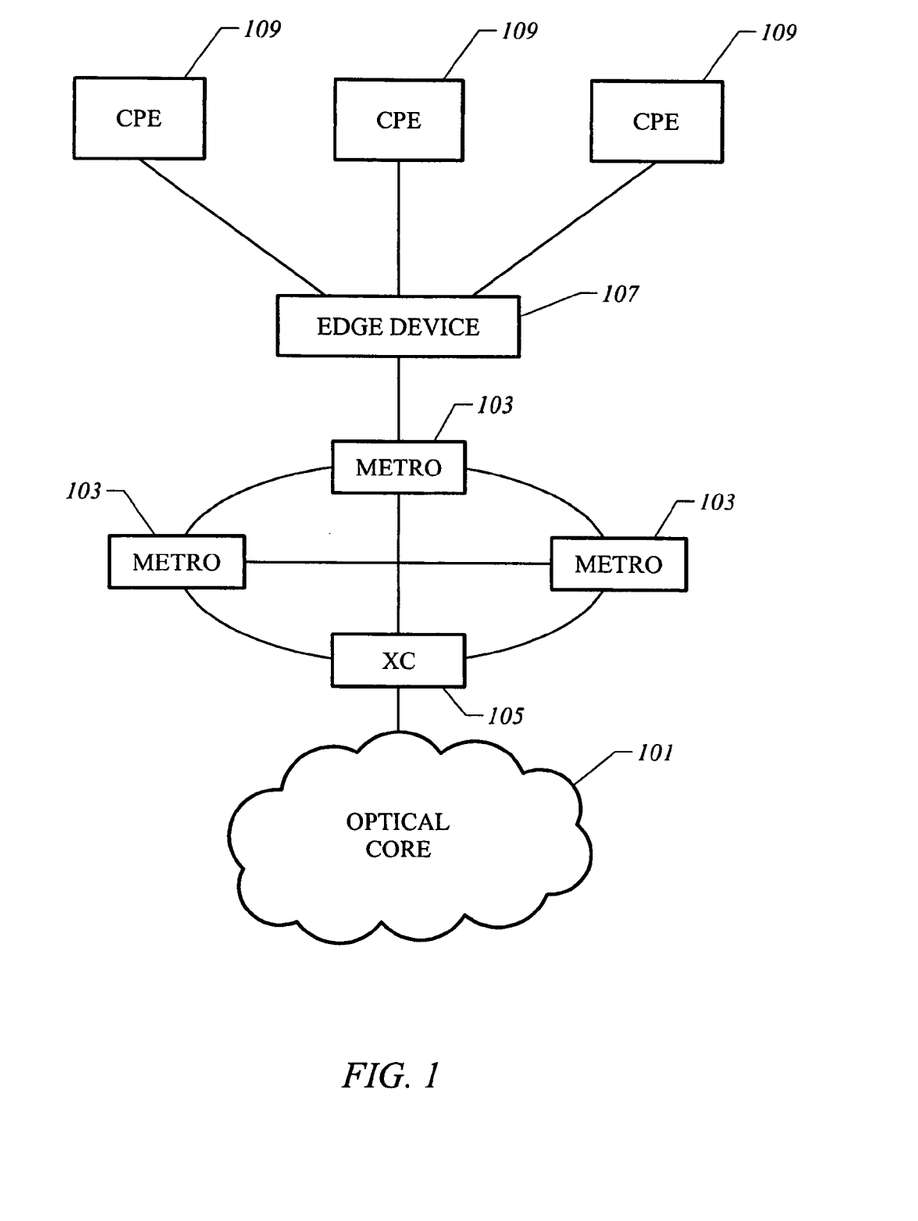
FIG. 1 shows an example of a network including multiple network elements and a network element switch.

FIG. 1 shows an example of a network including a network element switch. The network shown is intended to illustrate exemplary network element switches that can utilize embodiments of the invention. However, the invention is not limited to the network shown and can be utilized in other network configurations.

An optical core 101 represents a high-speed optical network. Optical core 101 can utilize optical network elements such as the Cisco ONS 15454 available from Cisco Systems, Inc., San Jose, Calif. In general, the optical core represents the next generation fiber optics network.

Within a metropolitan area, metro network elements 103 can transmit network data within a ring such as a Synchronized Optical Networks (SONET) ring. An example of a metro element 103 is the Cisco ONS 15454 available from Cisco Systems, Inc., San Jose, Calif.

A cross-connect (XC) 105 provides switching and allows data to be transmitted between optical core 101 and metro elements 103. As a bandwidth of optical core 101 is typically higher than the metro element ring, cross-connect 105 can act to aggregate multiple data signals for use in the higher bandwidth network. Cross-connect 105 is just one example of a network element switch that can utilize embodiments of the invention.

An edge device 107 transmits network data to and from customer premise equipment (CPE) 109. Edge device 107 is a network element that, among other things, receives network data for one of the customer premise equipment 109 and routes the network data to the appropriate destination. An example of etch device 107 is the Cisco ONS 15327 available from Cisco Systems Inc., San Jose, Calif. Although this network description is (or is expected to be) fairly common, embodiments of the invention are not limited the network as has been described.

Embodiments of the invention utilize a multi-stage switching fabric. Each stage typically includes multiple nodes, where the nodes perform switching of the signals at that stage. As mentioned previously, each node can be implemented as a full $N^2$ cross-connect or a 2N Clos matrix. Since some embodiments utilize 2N Clos matrices, it may be beneficial to discuss these initially.

Figure 2:
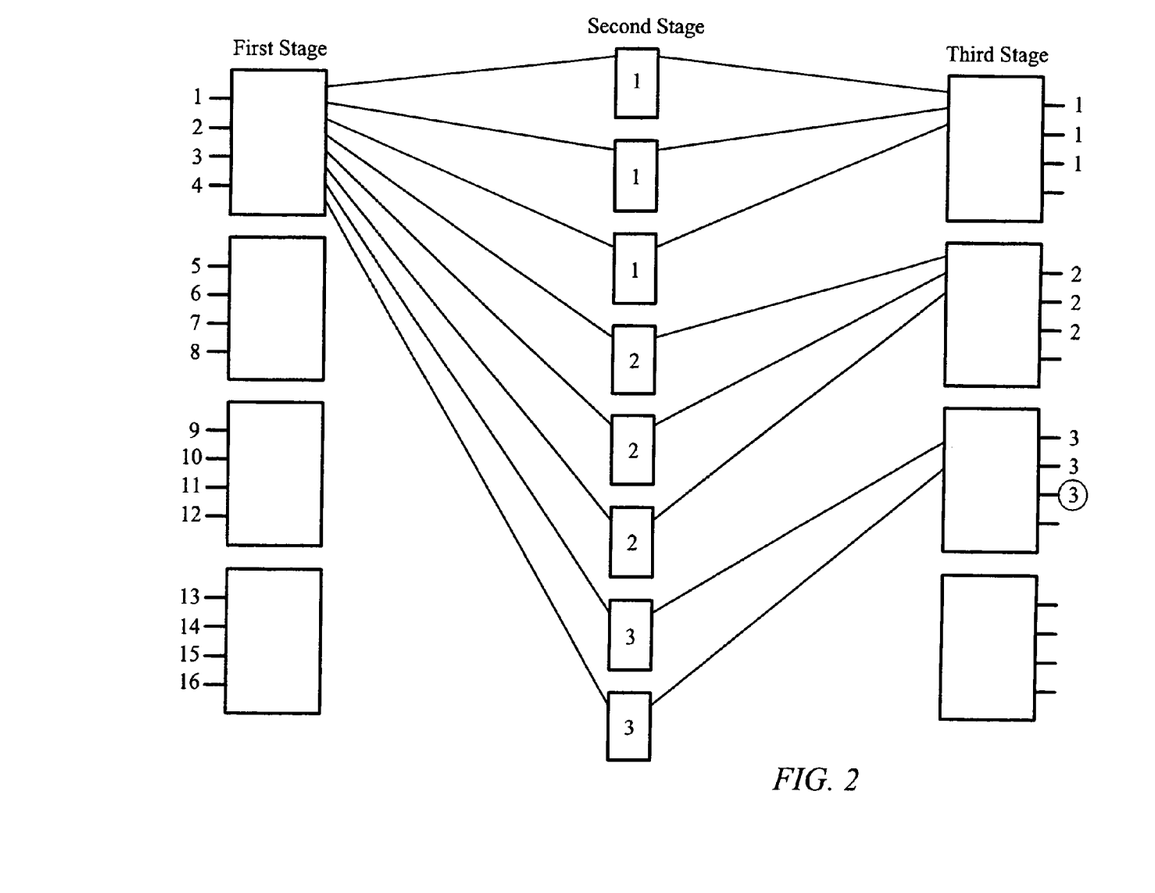
FIG. 2 shows Clos matrix that is non-rearrangably blocked.

FIG. 2 shows an example of a 2N Clos matrix exhibiting non-rearrangable blocking. As shown, the 2N Clos matrix has N=4. Thus, the nodes at the first stage include 4 inputs (N), the center stage includes 8 nodes (2*N), and the third stage includes nodes that include 4 outputs (N). Although there is only one connection between nodes of different stages, for simplicity, not all the connections between the nodes are shown.

Assume that it is attempted to tri-cast inputs 1, 2 and 3. As shown, each of these signals is tri-cast to the second stage. However, utilizing this technique results in there not being an available center stage node for the last signal 3 (see the circled output). Non-rearrangable blocking has occurred because a center stage node is not available to complete a connection. No matter how the other connections are rearranged, no common center stage node can be found.

With embodiments of the invention, the restriction of any input to any output (any-to-any mapping) is relaxed in order to guarantee non-blocking. In general, to obtain non-blocking multi-cast, the inputs to and outputs from the center stage are controlled.

Figure 3:
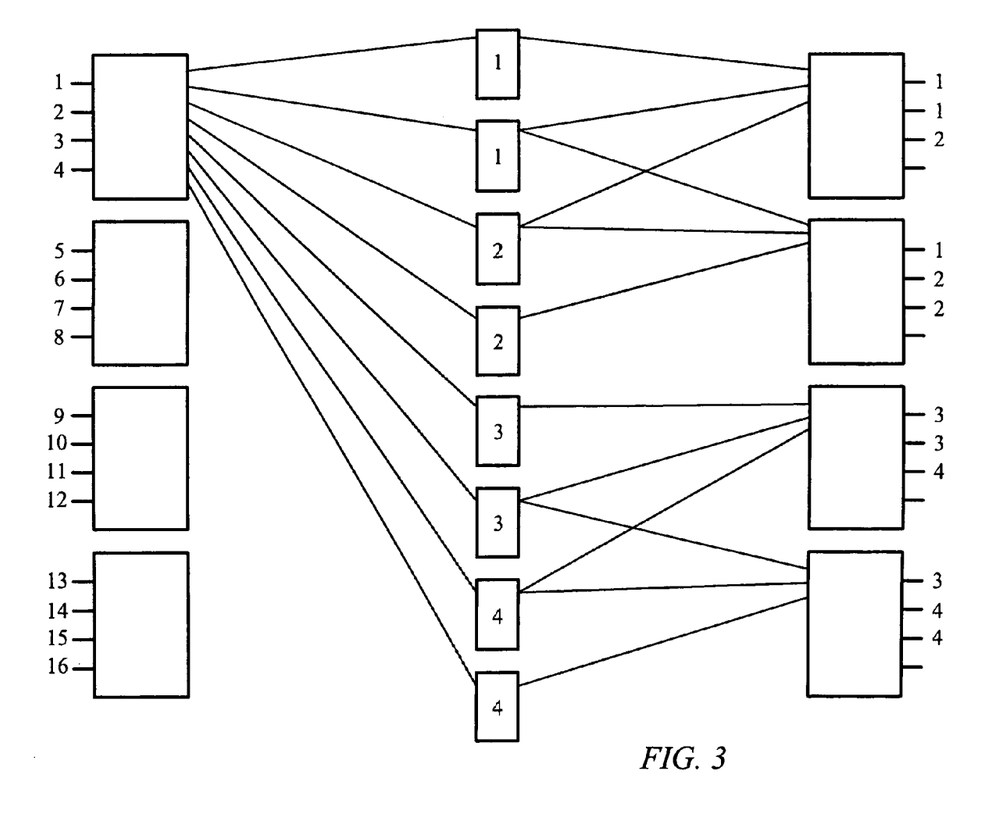
FIG. 3 shows a Clos matrix that is similar to FIG. 2 except that non-blocking tri-cast has been obtained for inputs 1-4.

FIG. 3 shows a Clos matrix that is similar to FIG. 2 except that non-blocking tri-cast has been obtained for inputs 1, 2, 3, and 4. As shown, each input signal has been restricted to use no more than two center nodes and non-blocking multicast has been achieved. Thus, by relaxing any-to-any mapping restriction, multicast is accomplished with no blocking probability.

Figure 4:
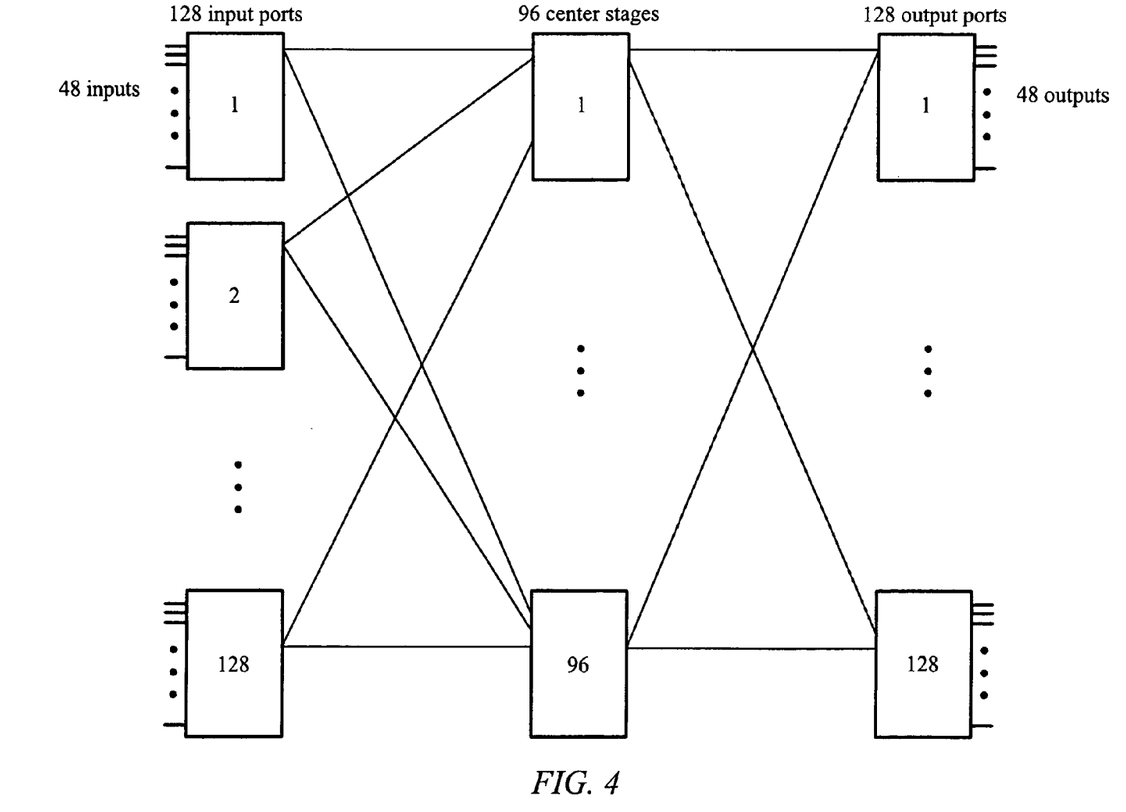
FIG. 4 shows an example of an asymmetric 2N Clos matrix where N=48.
Figure 5A:
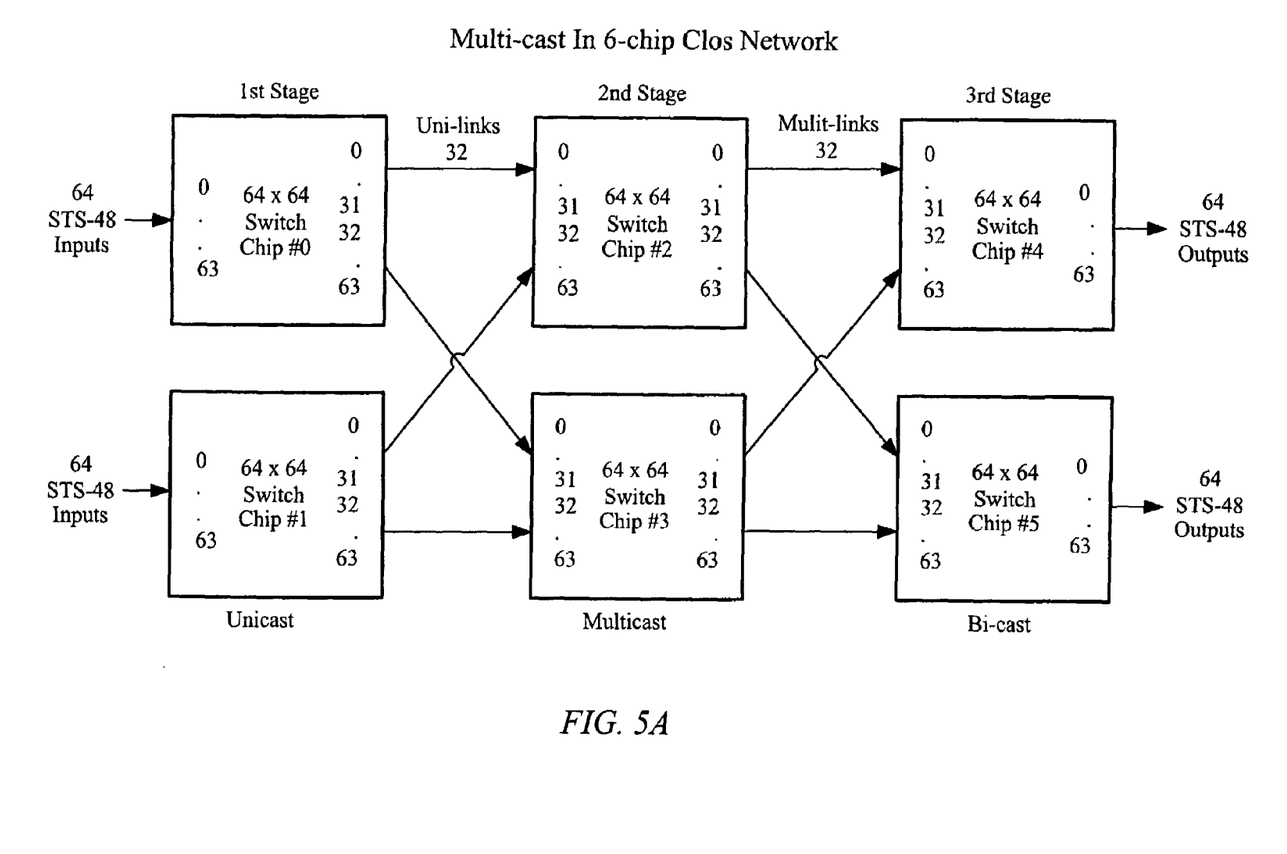
FIGS. 5A and 5B show six chip Clos matrices that can be utilized to implement the Clos matrix shown in FIG. 4.
Figure 5B:
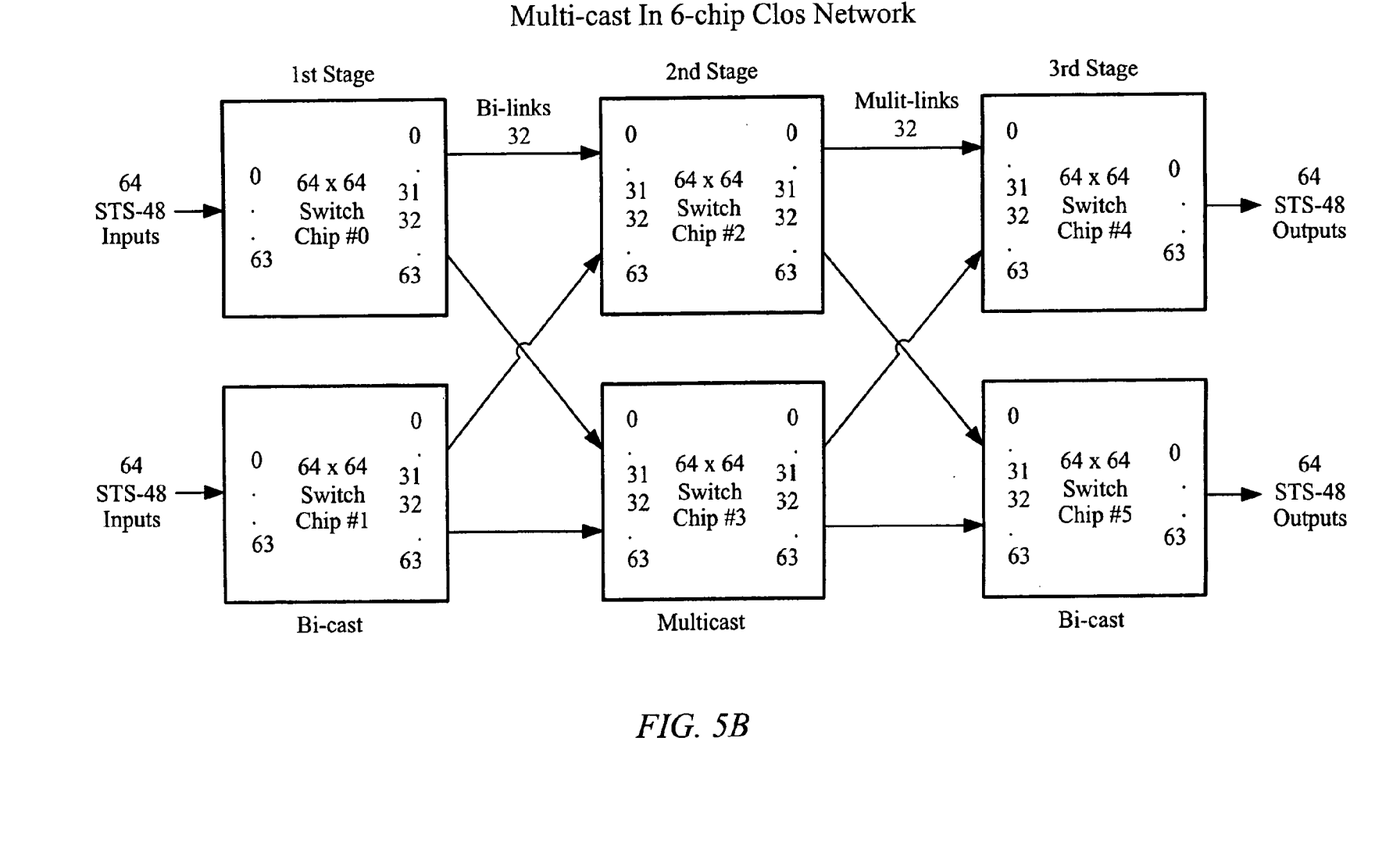

FIG. 4 shows asymmetric 2N Clos network where N=48. As shown, there are 48 inputs and outputs, and 96 center nodes (2*N). Additionally, there are 128 first and third stage nodes. The 2N Clos matrix shown in FIG. 4 can be implemented utilizing six chips (or grooming chips) connected as shown in FIGS. 5A and 5B. Each chip (identified as chips #0-5) has 2N inputs and outputs. There are 2(N−1) connections between each chip of each stage. The six chip embodiments in FIGS. 5A and 5B are for N=6. The resulting switching fabric allows for rearrangably non-blocking up to 64-cast on each output chip (total of 128 possible outputs on both output chips). The differences between FIGS. 5A and 5B will be discussed later.

Each chip can be either a full $N^2$ cross-connect or a 2N Clos matrix. For purposes of discussion, each chip will be assumed to be implemented in a single chip and be an asymmetric 2N Clos matrix. In a preferred embodiment, the six chips are identical and are the VC 2002 Grooming Switch available from Velio Communications, Milpitas, Calif. Each Velio 2002 Chip is a 72×72 2N Clos matrix. Multi-chip implementation of a grooming switch and full $N^2$ grooming cross-connects equally apply.

Using traditional analysis, the six chip Clos matrix shown in FIGS. 5A and 5B would be limited to a maximum of tri-cast and maintain a zero blocking probability. The first stage would be restricted to uni-cast, otherwise there would be a blocking probability exiting the first stage. The second and third stages could each perform bi-cast. A signal could be quad-cast if all four outputs were on a same output chip or if the outputs were split 2/2 among the chips. If however, the outputs were split 3/1, it would require tri-cast from either the second or third stage chips which would introduce a blocking probability.

As mentioned above, the multi-casting restrictions of the Clos network are a result of mapping any input to any output. If the mappings were controlled to avoid the blocking cases, a much higher degree of multi-casting can be achieved. With an embodiment of the invention, the inputs to and outputs from the second stage are carefully controlled to avoid blocking. In this manner, non-blocking multi-cast of the number of single chip ports times 2 (ports*2) can be achieved. With respect to FIG. 5A, this translates to a multi-cast of 128 to each chip.

Now referring to FIG. 5A which shows a six chip Clos matrix, there are two groups of inputs to and two groups of outputs from each second stage chip. The input groups, uni-links, route signals from chip #0 and chip #1. The output groups, multi-links, route signals to chip #4 and chip #5. Preferably, both inputs and outputs on each second stage chip are traversed in a round-robin fashion to insure that center stage nodes are used efficiently. If a signal is desired on X outputs of a third stage chip, it should appear (X+1)/2 times on its input (i.e., restrict the third stage to bi-cast).

The first stage chips provide the appropriate inputs to the second stage chips. A given signal is sent to either chip #2 or chip #3, not both. The first stage is uni-cast, which is strictly non-blocking on a 2N Clos matrix.

If each input signal is restricted to use no more than two center stage nodes (see FIG. 4), non-blocking can be achieved. To obtain non-blocking multi-cast, the inputs to and outputs from the center stage are controlled. The center stage's job is to route signals to the appropriate third stage chip. When creating a circuit, the input and output chips are fixed. There are two different paths a signal can take. The signal may be routed through second stage chip #2 or chip #3. The key is that the second stage chip only has to deliver the signal to the appropriate third stage chip. It is not required that the signal be routed on any particular port/STS combination. The only restriction is that the signals are routed to the correct output chip.

The third stage is responsible for routing the signals received from the second stage chips to the desired output locations. This stage is also required to perform a bi-cast of signals if required. A 2N Clos matrix is rearrangably non-blocking for bi-cast.

When the matrix fabric is updated, several options are available. Rearrangement of the circuits could be performed. However, this could be very complicated. Given the processing power available on many switching fabrics, a simpler solution may be to recalculate the entire fabric. An advantage of recalculating the matrix is that the time required is likely to be constant regardless of the number of changes made.

A six chip switching network includes six cross-connected chips arranged in three stages. Two input chips constitute the first stage and each input chip includes 2N inputs for a total of 4N inputs where N is $\geq 1$. Similarly, two output chips constitute the output stage with each output chip having 2N outputs totaling 4N outputs for the network. The center stage also includes two chips with each chip connected to chips in the other stages by N links.

The difference between the networks shown in FIGS. 5A and 5B are that the first stage is uni-cast in FIG. 5A and the first stage in bi-cast in FIG. 5B. The network shown in FIG. 5A would not be able to support arbitrary multi-cast. However, because the network shown in FIG. 5B utilizes bi-cast out of the input stage, arbitrary multi-cast can be supported. It should be noted that the six chip network is rearrangably non-blocking for multi-cast with the input and output stages restricted to bi-cast and the center stage capable of multi-cast. Uni-cast from the input stage is sufficient if multi-cast is limited to (2N-1).

Figure 6A:
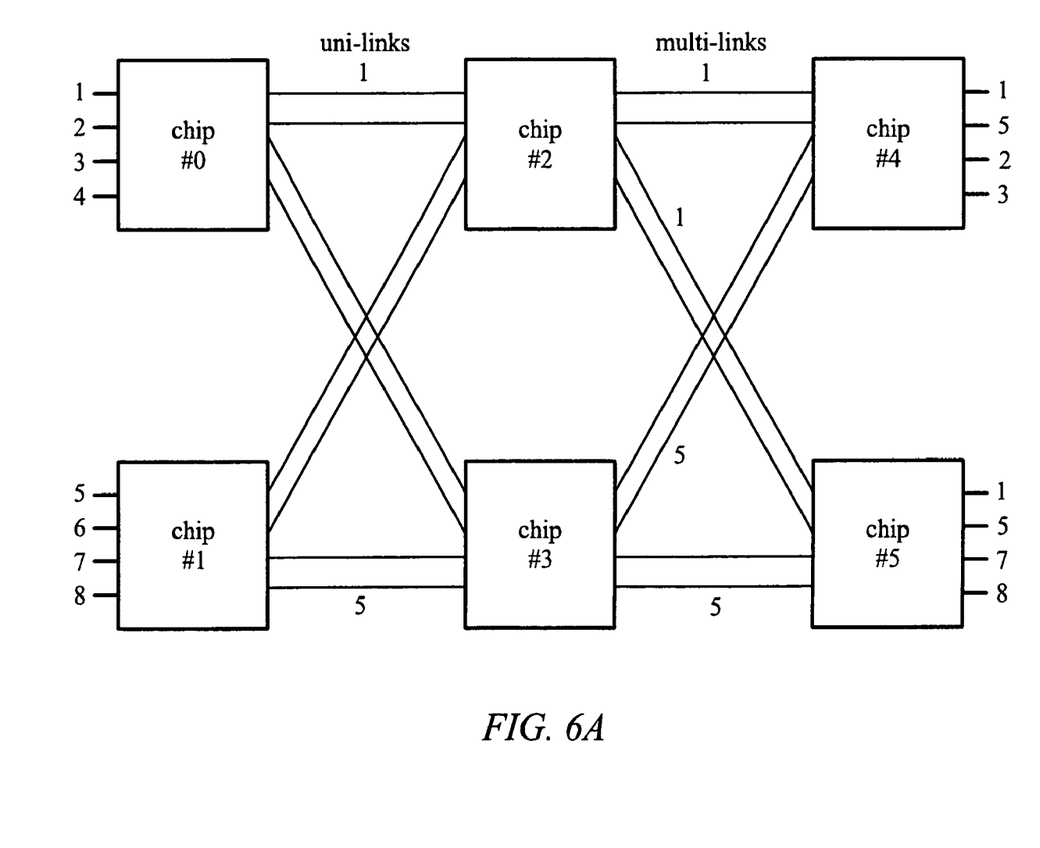
FIGS. 6A-6C show examples of making connections through a six chip Clos matrix and FIG. 6D show a table that illustrates the affects of different configurations.

Now that a six chip network has been described, it may be beneficial to describe a process for mapping signals across the network. FIG. 6A shows a six chip network with 2N inputs and 2N outputs with N=2. As shown, the signals are identified as signals 1-8. Additionally, the desired signals on the outputs are shown.

In order to obtain the desired outputs, signal 1 has been routed through chip #0 to chip #2 and then bi-cast from chip #2 to chips #4 and #5. Signal 5 has been routed through chip #1 through chip #3 and then bi-cast from chip #3 to chips #4 and #5.

Figure 6B:
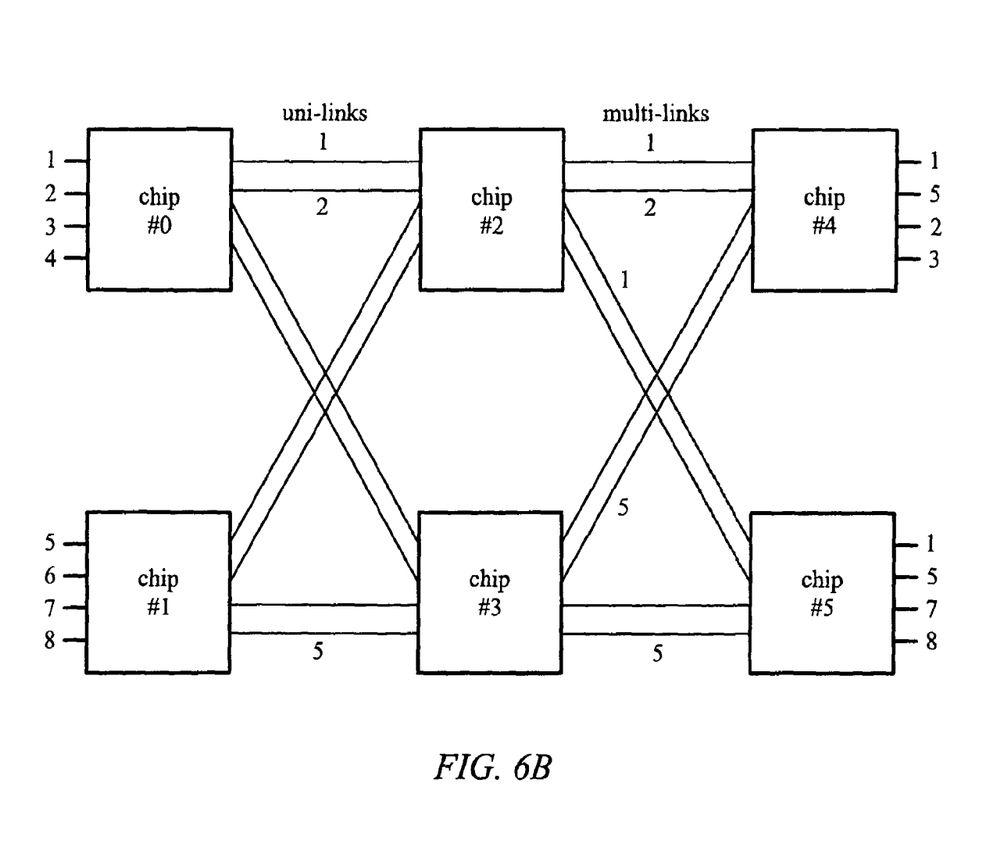
Figure 6C:
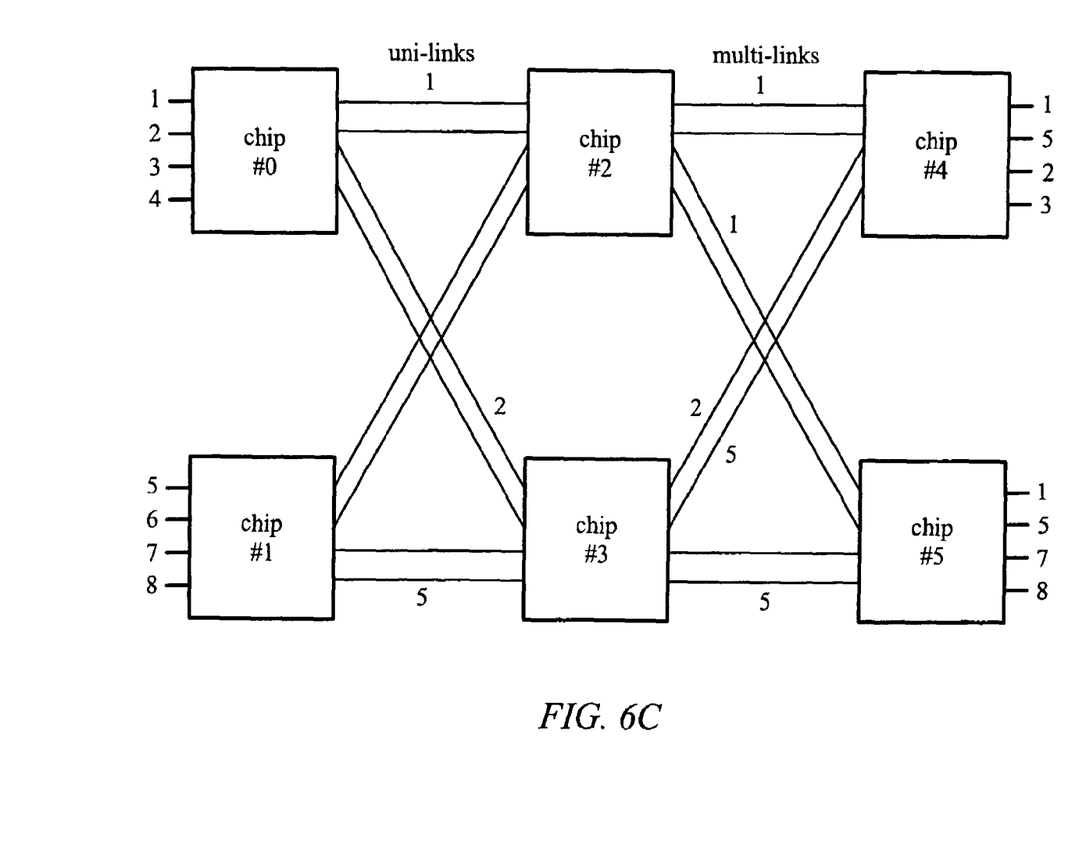

Assume now that the next signal to be connected through the network shown in FIG. 6A is signal 2. FIGS. 6B and 6C show two different routing configurations for signal 2.

In FIG. 6B, signal 2 is routed through chip #0 to chip #2 and then to chip #4 and its output. In contrast, FIG. 6 shows that signal 2 has been routed through chip #0 to chip #3 and then to chip #4 and its output.

In one embodiment of the invention, the routing for a specific signal is chosen to minimize the differences between the number of links between the stages. In order to better illustrate this technique, FIG. 6D shows and example of differences in the number of links between the nodes shown in FIGS. 6B and 6C.

Figure 6D:
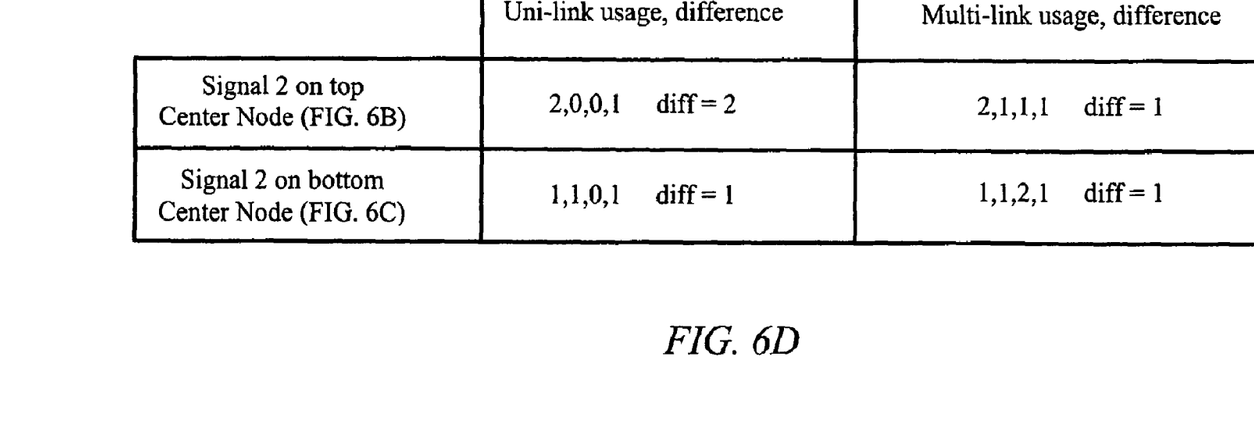

Referring to the table in FIG. 6D, the first column represents the difference in the number of links between the chips in the first stage and chips in the second stage. The second column shows differences in the number of links between the number of links between chips of the second stage and chips of the third stage.

The first row represents the differences for FIG. 6B where signal 2 is routed through the top center node. As shown in the table, the number of links between chip #0 and chip #2 is 2, the number of links between chip #0 and chip #3 is 0, the number of links between chip #1 and chip #2 is 0 and the number of links between chip #1 and chip #3 is 1. Since the greatest number of links is 2 and the least number of links is 0, the table shows that the difference in links between the first stage chips and the second stage chips is 2. In a similar manner, the table shows that the difference in the number of links between the second stage chips and the third stage chips is 1 for FIG. 6B.

When the links between the chips in the different stages are counted and the difference is calculated as described above, FIG. 6D shows that the difference in the number of links between the first stage chips and the second stage chips is 1 when the signal 2 is routed through the bottom center node. Also, the difference in the number of links between the second stage chips and the third stage chips when the signal is routed through the bottom center node is 1.

Accordingly, signal 2 would be routed through the bottom center node as shown in FIG. 6C because the differences between the number of links between the chips of the different stages is minimized (e.g., the difference between the number of links between the chips of the first and second stages instead of two). In general, this methodology attempts to utilize all available paths are evenly as possible.

Figure 7:
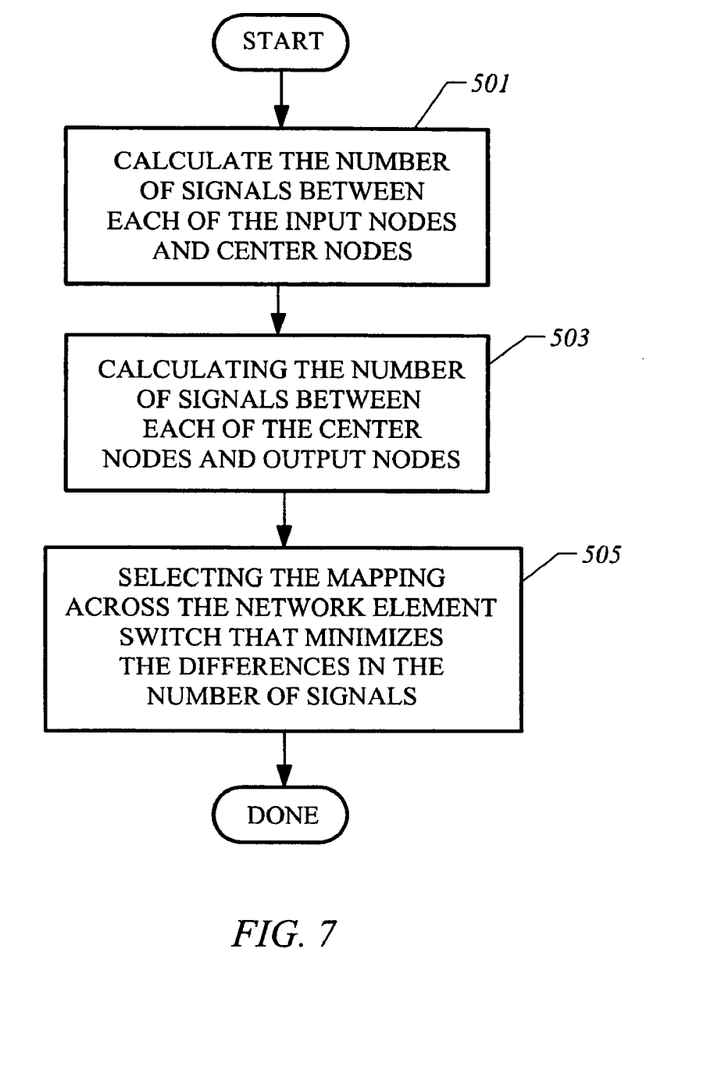
FIG. 7 shows a flowchart of a process of mapping signals across a network element switch having input nodes, center nodes and output nodes.

Now that an example has been described, FIG. 7 shows a flow chart of a process of mapping signals across a network element switch having input nodes, center nodes and output nodes. At a step 501, the number of signals between each of the input nodes and center nodes is calculated. For each possible mapping of a specific signal across the network element switch, the number of signals between each of the input nodes and center nodes is calculated.

At a step 503, the number of signals between each of the center nodes and output nodes is calculated. As before, for each possible mapping of the specific signal across the grooming switch, the number of signals between each of the center nodes and output nodes is calculated.

The mapping across the network element switch is selected that minimizes the differences in the number of signals at a step 505. Thus, the mapping of the specific signal across the network element switch is selected where the difference in the number of signals between each of the input nodes and center nodes is minimized and the difference in the number of signals between each of the center nodes and output nodes is minimized.

Although in the preferred embodiments the switch fabric utilizes three stages, other embodiments can use fewer or more stages. Additionally, FIG. 7 shows an embodiment that minimizes the difference in the number of signals between both the first/center stages and the center/last stage; however, other embodiments can minimize the difference in the number of signals between only two stages or more than two stages.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A network element switch, comprising:
a pair of input nodes, each input node having 2n inputs and 2n outputs, where n is greater than or equal to 1;
a pair of center nodes, each center node receiving n inputs from each of the input nodes and having 2n outputs;
a pair of output nodes, each output node receiving n inputs from each of the center nodes and having 2n outputs; and
a device configured to calculate the number of signals between each of the input nodes and the center nodes and the number of signals between each of the center nodes and the output nodes, and map signals between nodes, wherein mapping between nodes is selected based on the calculations to minimize any differences between the number of signals between each of the input nodes and the center nodes and any differences between the number of signals between each of the center nodes and the output nodes;
wherein the mapping of signals is used to make connections through the network element switch.

2. The network element switch of claim 1, wherein n is greater than or equal to 2.

3. The network element switch of claim 1, wherein each center node is multi-cast and each output node is bi-cast.

4. The network element switch of claim 3, wherein each input node is uni-cast.

5. The network element switch of claim 3, wherein each input node is bi-cast.

6. The network element switch of claim 1, wherein the inputs and outputs carry STS-48 signals.

7. The network element switch of claim 1, wherein each node is a 2N Clos matrix.

8. The network element switch of claim 1 wherein an any-to-any mapping is not guaranteed from the pair of input nodes to the pair of output nodes.

9. A network element switch, comprising:
a pair of input means for switching, each input means for switching having 2n inputs and 2n outputs, where n is greater than or equal to 1;
a pair of center means for switching, each center means for switching receiving n inputs from each of the input means for switching and having 2n outputs;
a pair of output means for switching, each output means for switching receiving n inputs from each of the center means for switching and having 2n outputs; and
a device configured to calculate the number of signals between each of the input nodes and the center nodes and the number of signals between each of the center nodes and the output nodes, and map signals between nodes, wherein mapping of signals between nodes is selected based on the calculations to minimize any differences between the number of signals between the nodes and the mapping of signals is used to make connections through the network element switch.

10. The network element switch of claim 9, wherein n is greater than or equal to 2.

11. The network element switch of claim 9, wherein each center means for switching is multi-cast and each output means for switching is bi-cast.

12. The network element switch of claim 11, wherein each input means for switching is uni-cast.

13. The network element switch of claim 11, wherein each input means for switching is bi-cast.

14. The network element switch of claim 9, wherein the inputs and outputs carry STS-48 signals.

15. The network element switch of claim 9, wherein each means for switching is a 2N Clos matrix.

16. A method of mapping signals across a network element switch having a plurality of input nodes, a plurality of center nodes and a plurality of output nodes, comprising:
for each possible mapping of a specific signal across the network element switch, calculating the number of signals between each of the input nodes and center nodes;
for each possible mapping of the specific signal across the network element switch, calculating the number of signals between each of the center nodes and output nodes; and
selecting the mapping of the specific signal across the network element switch where the difference in the number of signals between each of the input nodes and center nodes is minimized and the difference in the number of signals between each of the center nodes and output nodes is minimized;
wherein the mapping of signals is used to make connections through the network element switch.

* * * * *